United States Patent

Karbachsch et al.

[11] Patent Number: 5,169,528
[45] Date of Patent: Dec. 8, 1992

[54] FILTER ELEMENT

[75] Inventors: Massoud Karbachsch, Göttingen; Peter P. Breitbach, Bretzenheim; Helmut Rüger, Pfaffen-Schwabenheim, all of Fed. Rep. of Germany

[73] Assignee: Seitz-Filter-Werke GmbH & Co., Bad Kreuznach, Fed. Rep. of Germany

[21] Appl. No.: 632,394

[22] Filed: Dec. 20, 1990

[30] Foreign Application Priority Data

Dec. 29, 1989 [DE] Fed. Rep. of Germany ....... 3943249

[51] Int. Cl.$^5$ ............................................ B01D 27/02
[52] U.S. Cl. ..................... 210/264; 210/282; 210/484; 210/502.1; 210/503; 55/77; 55/474; 55/512; 55/517; 55/527
[58] Field of Search ............... 210/264, 282, 283, 284, 210/484, 502.1, 503, 505, 189, 268, 270, 297, 324, 354, 359, 398; 55/485, 487, 512, 517, 527, 77, 181, 390, 474

[56] References Cited

U.S. PATENT DOCUMENTS

| | | | |
|---|---|---|---|
| 3,780,867 | 12/1973 | Zirlis | 210/282 |
| 3,836,005 | 9/1974 | Bauer | 210/282 |
| 4,065,392 | 12/1977 | Gammon | 210/282 |
| 4,138,337 | 2/1979 | Smith | 210/282 |
| 4,212,743 | 7/1980 | Van Meter et al. | 210/282 |
| 4,366,054 | 12/1982 | Krashein | 210/283 |
| 4,828,698 | 5/1989 | Jewell et al. | 210/282 |
| 4,986,913 | 1/1991 | Schafft | 210/505 |

FOREIGN PATENT DOCUMENTS

| | | |
|---|---|---|
| 1486804 | 4/1973 | Fed. Rep. of Germany . |
| 3001674 | 7/1981 | Fed. Rep. of Germany . |
| 3204022 | 8/1983 | Fed. Rep. of Germany . |
| 3802816 | 8/1989 | Fed. Rep. of Germany . |
| 3817793 | 11/1989 | Fed. Rep. of Germany . |
| WO/82/3851 | 11/1982 | PCT Int'l Appl. ................ 210/354 |
| 227707 | 1/1925 | United Kingdom . |
| 448961 | 6/1936 | United Kingdom . |
| 507064 | 6/1939 | United Kingdom . |
| 1013770 | 12/1965 | United Kingdom . |
| 1423297 | 2/1976 | United Kingdom . |
| 1456581 | 11/1976 | United Kingdom . |
| 2120121 | 11/1983 | United Kingdom . |
| 2154894 | 9/1985 | United Kingdom . |

Primary Examiner—Robert A. Dawson
Assistant Examiner—W. L. Millard
Attorney, Agent, or Firm—H. Gibner Lehmann; K. Gibner Lehmann

[57] ABSTRACT

A regenerable deep bed filter element provided as a closed system, in the case of which a deep bed filter (21), disposed inside at least one hollow-cylindrical chamber (17), if formed by a bulk material filling of regenerable, filtration-active substances of a particulate and/or fibrous structure. The hollow-cylindrical chamber can be flowed through radially by means of porous inner and outer peripheral walls (18, 19). The deep bed filter can be regenerated by flushing back with water, steam or chemical cleansing agents, during which the filtration-active substances remain inside the chamber (17).

9 Claims, 3 Drawing Sheets

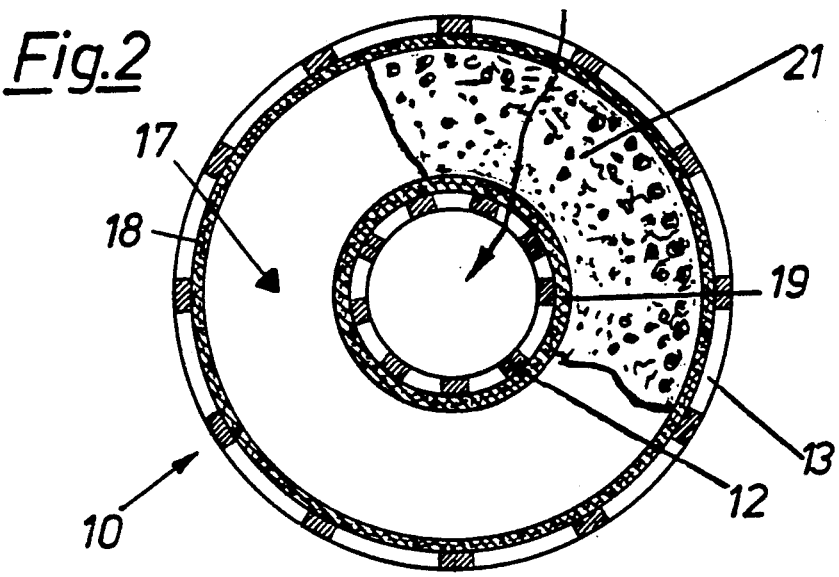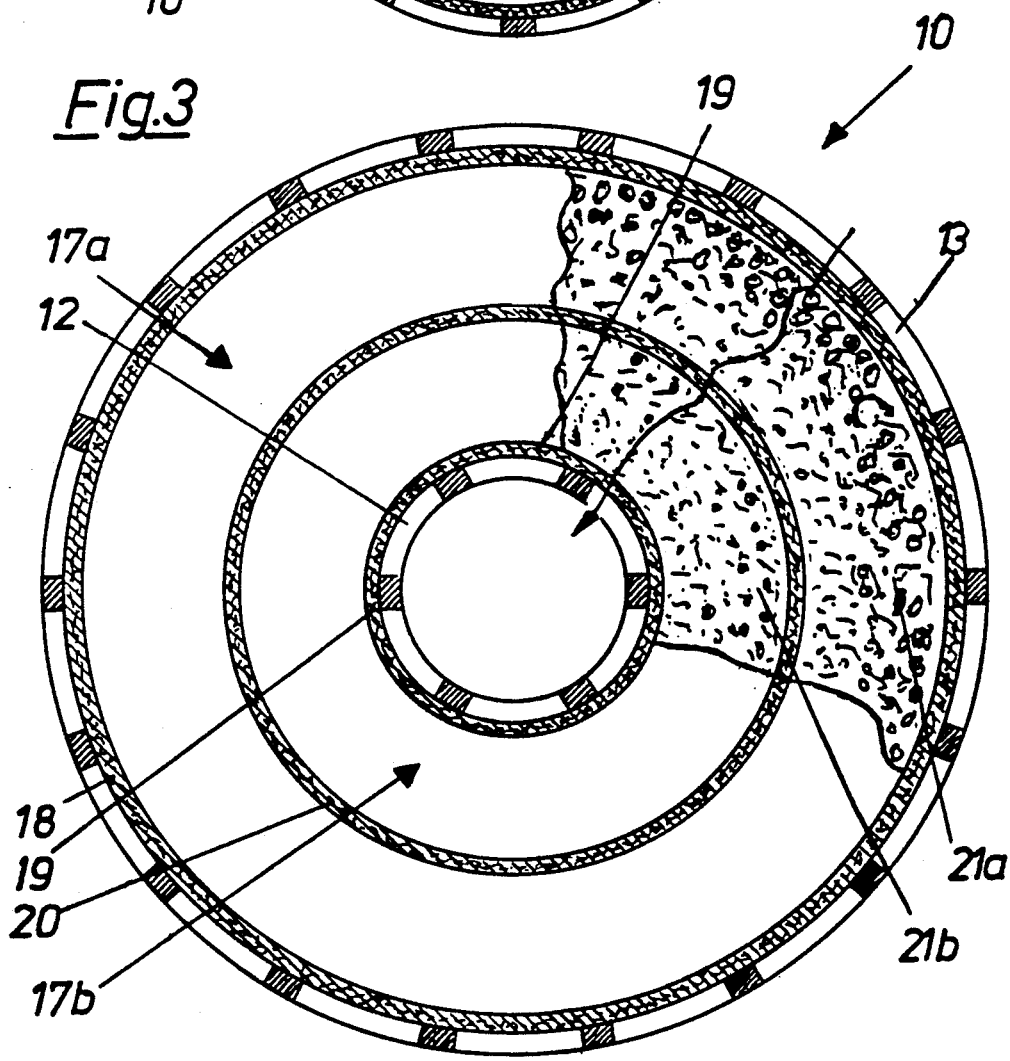

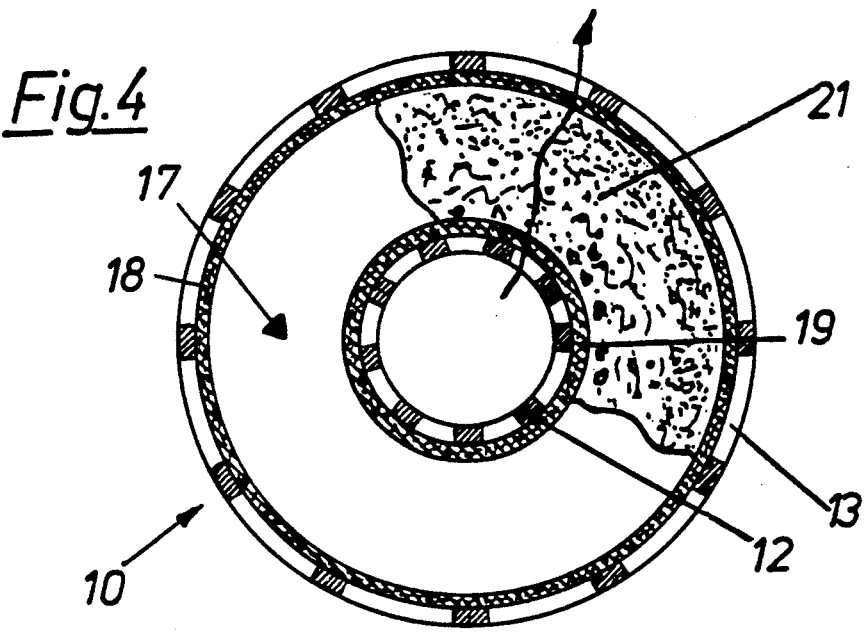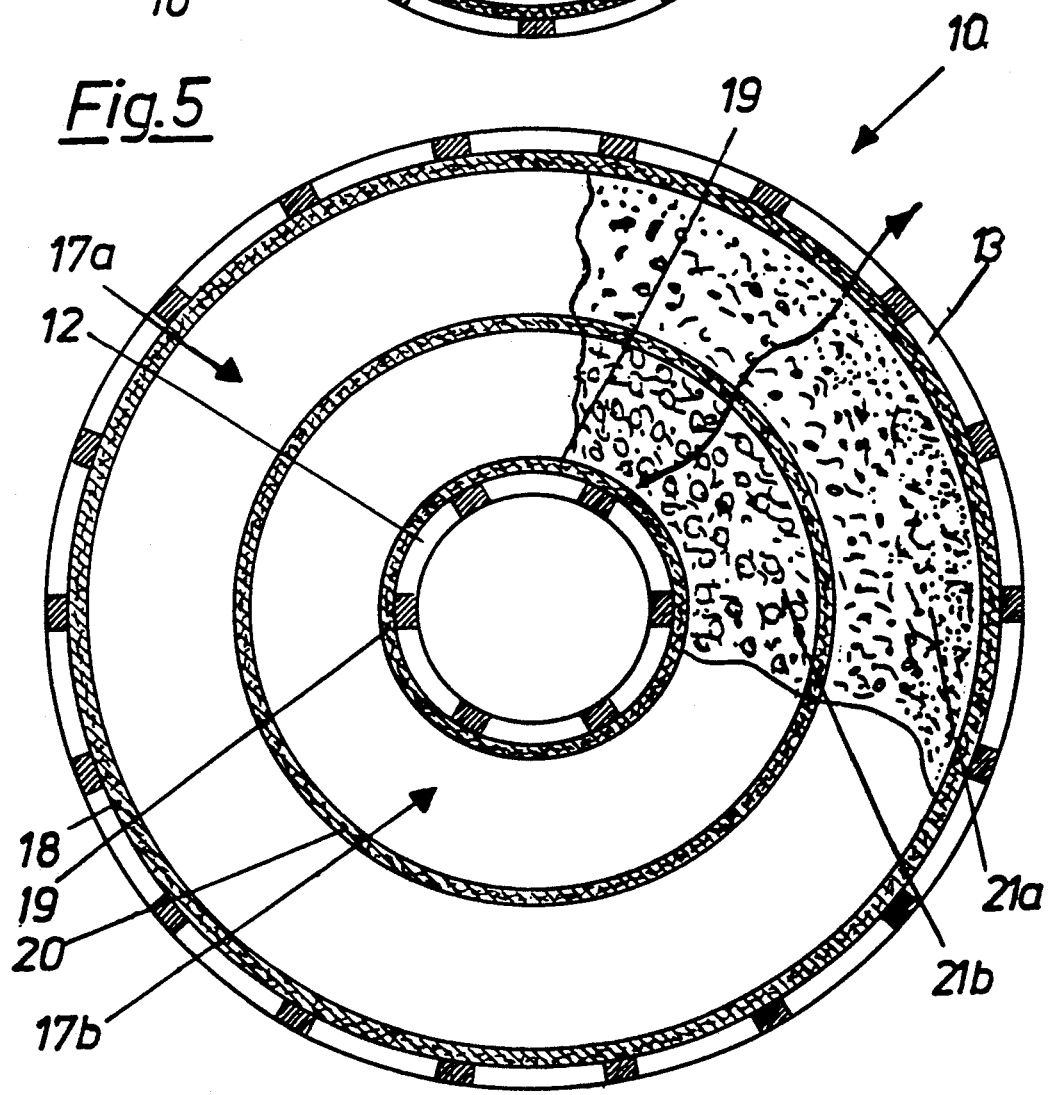

FILTER ELEMENT

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

CROSS REFERENCES TO RELATED APPLICATIONS

The present application claims priority under 35 USC 119, of West German Application No. P 39 43 249.1 filed Dec. 29, 1989, by Seitz-Filter-Werke Theo & Geo GmbH & Co KG, and entitled "Geschlossenes Filterelement".

BACKGROUND OF THE INVENTION

Field of the Invention

This invention relates to a closed filter element for filtering flowable, in particular fluid, media, such as pharmaceutical or chemical preparations, drinks, etc., of which the inner space comprises at least one hollow-cylindrical chamber which is delimited by peripheral walls, through which the medium to be filtered can flow over the entire axial length thereof, and by sealing closure components at the end face, and contains a filter member which can accommodate flow in an essentially radial manner.

DESCRIPTION OF THE RELATED ART INCLUDING INFORMATION DISCLOSED UNDER 37 CFR §§1.97-1.99

Filter elements of this type, also known as filter cartridges, are described in DE-OS 38 17 793, for example. In the case of filter cartridges of this type, there is formed between a central tube and a support casing tube, which are both provided in a grid-like manner with apertures, a hollow-cylindrical chamber which is closed at both front ends with end caps and in which a wound or folded filter member, which is formed from filter layers or filter membranes, is mounted. The filtration operations which can be performed with these known filter cartridges are consequently restricted to filtration with filter layers or filtration with filter membranes. In particular, the possibilities for flushing back and regeneration with filter elements of this type are considerably limited.

There is known from DE-OS 38 02 816 a cartridge-like filter element in the case of which the outer peripheral wall is formed as a porous support layer for a filter cake. This filter cake is formed by the deposition of filter material, for example pebble-like bulk material and/or fibre mixtures and adsorbents, such as activated carbon, silicic acid and the like.

When the filter cake has been used it is washed away by flushing back and replaced by a filter cake which is to be newly deposited, it being possible, however, for the deposit-filter material of the removed filter cake to be regenerated outside the filter housing in a complicated manner, if necessary. A new filter cake must, however, be deposited each time before the filtration process is continued.

There is disclosed in DE-OS 32 04 022 a filter cartridge in the case of which a hollow-cylindrical chamber is formed between an outer peripheral wall and an inner peripheral wall and is divided into two hollow-cylindrical partial chambers by an impermeable intermediate wall extending only over a part of the axial length of the chamber. In this connection the outer peripheral wall and the inner peripheral wall are formed on a part of the axial length thereof, lying opposite the intermediate wall such that they are porous and also leaktight. The chamber is filled with a granulated material of filter agents and adsorption agents. As a result of the construction of the peripheral walls and the arrangement of the impermeable intermediate wall, a flow path is determined within this granulated material in an essentially axial manner through the one partial chamber and, aligned in the opposite direction, axially through the second partial chamber. A filter cartridge of this type is designed for the adsorptive purification of fluids at low flow velocities and does not provide any possibility for performing clarification and particle filtration operations.

SUMMARY OF THE INVENTION

In contrast thereto, the invention has for an object the provision of a closed filter element having means by which unique filtration operations of the deposition filtration type can be performed, characterized by the filtering material in part migrating and being deposited to form a filter cake which can be washed out while still remaining in the closed system with an improved degree of efficiency, as by flushing back as well as by being chemically regenerated, and, after such washing out and regeneration processes, such cake is directly available to be used again without any appreciable loss of material.

In accordance with the invention, this object is achieved in that the filter member disposed in the interior of the hollow-cylindrical chamber is formed by a bulk-material filling of regenerable, filtration-active substances characterized by a particulate and/or fibrous structure, and by forming the peripheral walls of the chamber so as to have a level of porosity which is capable of retaining the filtration-active substances of the filter member while still ensuring that the medium to be filtered can pass through, the filtration-active substances being selected to act as auxiliary filter agents which can form a deep bed filter and are capable of migrating and being deposited, and at least one peripheral wall of the filter element being formed in the manner of a porous, wet-resistant support layer.

The bulk-material filling of regenerable filtration-active substances accommodated in the hollow-cylindrical chamber is formed very quickly into a high-performance, asymmetrical deep bed filter on the porous peripheral wall, on the discharge side of the chamber by the action of the medium being filtered as it flows radially through the chamber and the bulk-material filling. If the deep bed filter formed in this way is completely filled with filtered out substances, in particular also turbidities, during the course of the filtration process, then by flushing back the bulk-material filling which was retained in this connection in the chamber, the filtration-active substances can be washed out rapidly and effectively and thus in an improved manner. If necessary, the filtration-active substances can also be regenerated from time to time by means of through-flowing steam and/or chemical agents, wherein it is also particularly advantageous for this purpose that the filtration-active substances to be regenerated are retained in the hollow-cylindrical chamber. Both after each washing-out process and also after the regeneration process the filtration-active substances retained in the interior of the hollow-cylindrical chamber are immediately available again in the form of a deep bed filter.

The filtration-active substances can essentially have the same structure such that the structural geometry thereof is symmetrical with respect to the direction of filtration. Within the scope of the invention, however, the filtration-active substances are preferably disposed inside the hollow-cylindrical chamber with a structural geometry which is asymmetrical with respect to the direction of filtration. This can be achieved in a particularly simple and preferred manner in that the bulk-material filling forming the deep bed filter consists of a mixture of filtration-active substances of differing thicknesses and/or charges and/or fibre lengths and/or particle sizes and/or particle geometries, i.e. random asymmetrical geometries. As a result thereof, when a radially outward flow filter element is subjected to forward or radially outward flow, in a corresponding manner there results a heterogeneous radial distribution of the porosity within the chamber. The fine particles and fibres are rinsed and moved radially outward in the direction of the flow, i.e. towards the outer, discharge side, and together form a dense yet porous outer layer, whilst the coarser and longer particles of fibres are not rinsed away or radially outward, and form a correspondingly more porous inner layer. There thus results a deep bed filter, of which the pore diameters decrease as the thickness increases toward the outside and one which is thus able to separate coarse particles fractionally and counteract an early blockage.

The material composition of the bulk material filling forming the deep bed filter can be adapted to special filtration operations in each case. Thus regenerable adsorption agents can be added to the bulk-material filling of the hollow-cylindrical chamber, forming the deep bed filter. Substances bringing about the stabilization of the medium to be filtered during filtration, such as polyvinylpolypyrrolidone, for example, can also be added, with the filtration-active substances, to the bulk-material filling of the hollow-cylindrical chamber, forming the deep bed filter. The latter addition is particularly suitable for stabilizing beer during filtration.

In accordance with the invention, two or more hollow-cylindrical chambers with a filling of filtration-active substances can also be mounted in an essentially coaxial arrangement within a common housing and separated from one another by porous intermediate walls, the latter being connected at the axial ends thereof in a sealed manner to closure elements common to all chambers. The development of coaxial chambers separated from one another offers the possibility of providing the various hollow-cylindrical chambers with fillings of filtration-active substances which are different from one another. As a result thereof, variations of the filtration operations to be performed can be carried out over considerably broader ranges.

In a particularly advantageous embodiment of the invention the hollow-cylindrical chamber or chambers are disposed inside a filter element support frame which is in the form of a filter cartridge and comprises a perforated core tube, a perforated peripheral tube and closure caps which hold these two tubes together and are secured on at least one of these tubes, the outer porous peripheral wall of the chamber or the outermost hollow-cylindrical chamber being supported on the inner side of the peripheral wall tube, and the inner porous peripheral wall of the chamber or the innermost hollow-cylindrical chamber being supported on the outer side of the core tube and all the porous peripheral walls being connected to the closure caps at both axial ends in a sealed manner.

In this connection the perforated core tube is formed in such a way that at both ends it comprises two sections which are impervious to fluids. The object of these sections is to prevent a short circuit between the non-filtered and the filtered material if hollow spaces form in the chamber as a result of the filter materials being compressed.

The porous peripheral walls may be in the form of support layers known for deposition filtering, in particular the pebble-like bulk material deposition filtration process (DE-PS 32 04 120). Within the scope of the invention, however, porous peripheral walls formed from a semi-permeable filter layer, a filter membrane, non-woven filter material and/or a combination thereof may be provided on the hollow-cylindrical chamber or chambers. In order to achieve the possibility of using the filter element according to the invention in a manner which is as universal as possible, it can be attempted for this purpose to form the filter element in such a way that it can be flowed radially forwards optionally either from the exterior inward or from the interior outward. In order to enable the filter element to be flowed forward either inwardly or outwardly it is advantageous if the two porous peripheral walls of each hollow-cylindrical chamber have an essentially identical structure and identical pore diameters.

Other features and advantages will hereinafter appear.

BRIEF DESCRIPTION OF THE DRAWINGS

Embodiments of the invention will be described in further detail in the following with reference to the drawings, wherein:

FIG. 2 shows the filter element according to FIG. 1 in section along the line A-B in FIG. 1, the medium to be filtered being assumed to flow in the direction from the outside radially to the inside.

FIG. 3 shows a (dual component) filter element according to the invention, provided with two coaxial chambers, in a type of illustration corresponding to FIG. 2, the medium to be filtered being assumed to flow from the outside radially to the inside.

FIG. 4 shows a section A-B through a filter element according to FIG. 1 with the assumption that the medium to be filtered is flowing from the inside radially to the outside, and FIG. 5 shows an illustration corresponding to FIG. 4, of a dual element according to the invention with the assumption that the medium to be filtered is flowing from the inside radially to the outside.

DESCRIPTION OF THE PREFERRED EMBODIMENTS

Figure 1:
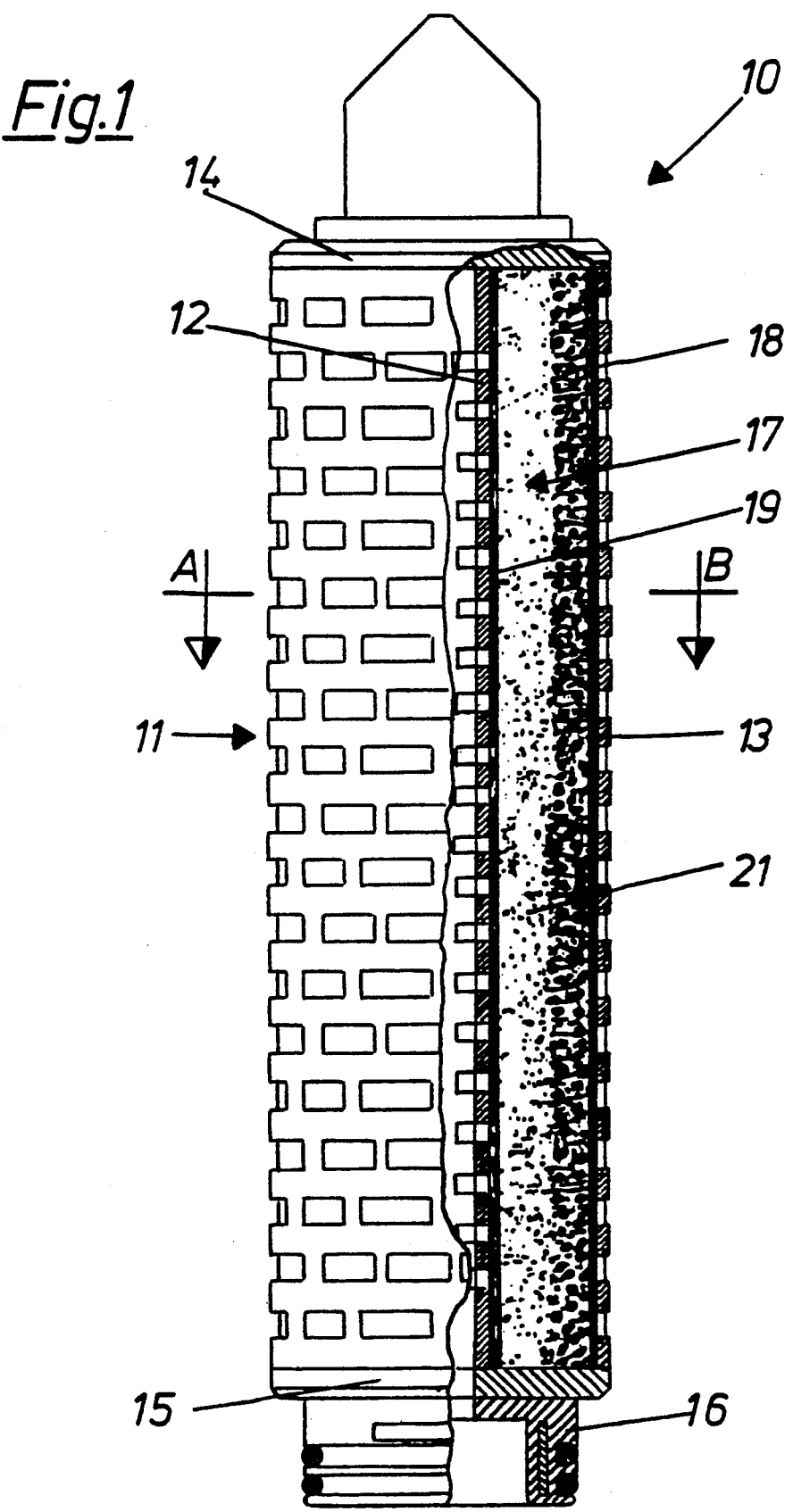
FIG. 1 shows a filter element according to the invention in the form of a (single component) filter cartridge, equipped with only one hollow-cylindrical chamber, partially in axial section.

The examples illustrated are filter elements in the form of filter cartridges, in particular deep bed filter cartridges 10. These deep bed filter cartridges 10 comprise a filter element support frame 11 which comprises a perforated core tube 12, a perforated support casing 13, a completely closed or impervious upper end wall or closure cap 14, bearing a guide element, and a lower impervious end wall or closure cap 15 which has a central opening to which an adapter 16 is connected. In the examples illustrated the hollow space formed between the core tube 12, the support casing 13 and the two closure caps 14 and 15 constitutes one hollow-cylindrical chamber 17 (FIGS. 2 and 4) or two hollow-cylindrical chambers 17a, 17b disposed coaxially with respect to one another (FIGS. 3 and 5). Each of these chambers 17, 17a, 17b is delimited at the inner periphery thereof and the outer periphery thereof by a peripheral wall 18, 19, 20 which extends over the entire axial length of the chamber 17, 17a, 17b in each case. These peripheral walls 18, 19, 20 comprise respectively outer, inner and intermediate porous, tubular wall members of the filter element, and are connected to the closure caps 14 and 15 on the inner side thereof in a manner such that they are sealed against flowable media, such that the hollow-cylindrical chambers 17, 17a, 17b are sealed on all sides and can be flowed through in an essentially radial manner through the porous peripheral walls 18, 19, 20. In the examples given in FIGS. 2 and 4, the outer peripheral wall 18 of the chamber 17 abuts against the inner side of the support casing 13 and the inner peripheral wall 19 abuts against the outer side of the core tube 12, facing the hollow-cylindrical inner space. In a corresponding manner, in the examples in FIGS. 3 and 5, the outer peripheral wall 18 of the outer chamber 17a abuts against the inner side of the support casing 13 and the inner peripheral wall 19 of the inner chamber 17b abuts against the outer side of the core tube 12, whilst a separating wall is disposed as a peripheral wall 20 common to both chambers 17a and 17b between the two latter chambers. The peripheral wall 20 may likewise be supported by a support casing.

The peripheral walls 18, 19, 20 may be formed in the manner of chemically, thermally and mechanically resistant support layers, which contain 20 to 50 weight percent (in relation to the dry fibre structure) of polyolefine fibres with a fibre length of 0.8 to 1.2 mm., preferably polyethylene fibres or polypropylene fibres. Porous, wet-resistant support layers of this type are known from DE-PS 32 04 120, for example, for the deposition of gravel or pebble-like bulk material filter cakes. Other structural possibilities can also be considered, however, for the porous peripheral walls 18, 19, 20, for example in the form of filter layers, filter membranes, and/or a combination thereof, of which the pore diameter is adapted to the filtration operation to be performed in each case, in such a way that they retain a fraction of particles which are coarse to a greater or lesser extent, whilst fine particles are retained in the deep bed filter 21 disposed in the chamber 17 or in the deep bed filters 21a and 21b disposed in the chambers 17a and 17b.

The deep bed filter cartridges 10 may be formed in order that they accommodate flow in only one direction for the filtration process, optionally from the outside to the inside (FIGS. 2 and 3), or from the inside to the outside (FIGS. 4 and 5). In such a case the pore diameters of the peripheral walls can be arranged in such a way that they are selected so as to decrease in size from the input side to the output side. If it is desired to construct a deep bed filter cartridge in order that it can accommodate flow from either the outside or the inside, depending on the case, then the peripheral walls 18, 19, 20 can have essentially the same porosity.

In the examples illustrated the deep bed filters 21, 21a, 21b mounted in the chambers 17, 17a, 17b are formed by regenerable, filtration-active substances which have both a particulate and a fibrous structure. These filtration-active substances can be deposited or collected on the porous peripheral walls, on the discharge side in each case, of the chambers 17, 17a, 17b in the manner of filter cakes by means of the medium to be filtered flowing radially through the chambers 17 or 17a and 17b respectively. Since the bulk material-like mixtures of filtration-active substances comprise finer and coarser particles as well as fibre particles or larger and smaller lengths in the examples illustrated, i.e. in all, components having different densities, charges, fibre lengths, sizes and geometries, the fine particles and fibres are rinsed by the medium to be filtered, flowing through the chambers in the flow direction, i.e. towards the discharge side, and form a structurally dense yet porous layer on the wall on the discharge side, whilst the coarser particles or longer fibres are not rinsed away and form a correspondingly porous layer. There thus results a deep bed filter 21, 21a, 21b of which the pore diameters decrease as the thickness increases and is thus able to deposit impurities fractionally and counteract an early blockage. For flow towards the deep bed filter cartridge 10 from the outside to the inside, FIGS. 2 and 3 show the manner in which the coarser particles and longer fibres of the mixture of filtration-active substances remain in the outer area of the deep bed filter 21, 21a, 21b in each case, whilst, in the inner area of the deep bed filter 21, 21a, 21b, the intermediate spaces between the coarser particles are filled by the fine particles and short fibres.

For a deep bed filter cartridge 10, which in the filtration process is essentially flowed through from the outside to the inside, FIG. 3 further shows that the inner hollow-cylindrical chamber 17b contains a filter member 21b which is totally formed of particles which are finer and fibres which are shorted than the deep bed filter 21a in the outer chamber 17a. In both deep bed filters 21a and 21b during the filtration process, however, the above-mentioned deposition of the fine particles and short fibres occurs in the radially inner area of the deep bed filter 21a or 21b respectively. Conversely, FIGS. 4 and 5 show deep bed filter cartridges 10 towards which the medium to be filtered is to flow from the interior. In such a case, the fine particles and short fibres are in each case deposited on the inner side of the outermost peripheral wall 18 or 20 of the chamber 17 or 17a, 17b respectively. In the example shown in FIG. 5 the filtration process employs flow generally from the interior to the exterior; the deep bed filter 21b disposed in the inner chamber 17b comprises coarser particles and longer fibres than the deep bed filter 21a disposed in the outer chamber 17a.

For flushing back, flow in the deep bed filter cartridge 10 is reversed, i.e. the flow direction is opposite to that for the filtration process. The mixture of filtration-active substances is treated inside the respective chamber with the rinsing or regeneration medium. The particles or impurities washed out during the flushing back process, or other particles absorbed by the deep bed filter during the filtration process, are rinsed and discharged through the peripheral chamber wall 18, 19, 20 on the discharge side in each case during the flushing back process. The regeneration of the filtration-active substances forming the respective deep bed filter 21, 21a, 21b in each case occurs in a corresponding manner.

The following substances can be taken into consideration as filtration-active substances in the deep bed filters 21, 21a, 21b for example: perlite, gravel or pebble-like bulk material, synthetic or natural fibres, freshly precipitated silicic acid, and other substances. In addition, the deep bed filters may be mixed with adsorption agents, for example activated carbon. Finally, substances which are necessary or advantageous for special filtration operations, for example substances causing stabilization of the medium to be filtered, such as polyvinylpolypyrrolidone, can be added to the deep bed filters 21, 21a, 21b. If substances of this type are used during the filtration process, they can be mixed with the medium to be filtered which is absorbed in the interior of the chamber 17 or chambers 17a, 17b respectively of the deep bed filter 21 or 21a and 21b respectively.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A filter element for filtering a fluid medium, said element having an inner space comprising a tubular chamber (17) with an inner peripheral wall and an outer peripheral wall through which walls the medium to be filtered can pass, said chamber having sealing closure elements (14, 15) at its ends and said filter element having an annular filter member (21) through which said fluid medium can flow in an essentially radial manner, said filter member (21) comprising a bulk-material filling of regenerable, filtration-action substances in the form of a particulate and/or fibrous structure, said peripheral walls having a degree of porosity which enables the said fluid medium to pass through them and with a predetermined direction of flow, said peripheral walls holding captive the said bulk material filling, at least one of said peripheral walls being constituted as a wet-resistant support layer for said filter member, and said bulk material filling consisting of auxiliary filter agents which have been carried to and deposited at said one peripheral wall by said fluid medium, said deposited auxiliary filter agents constituting on said one wall, a deep bed filter (21) characterized by decreasing porosity as a result of said predetermined direction of flow, said chamber (17) being disposed inside a filter element frame (11), which is formed in the manner of a filter cartridge and which comprises a perforated core tube (12), a perforated wall tube (13), and said sealing closure elements (14, 15) holding said tubes (12, 13) in position and being secured to at least one of said tubes, the outer one of the said peripheral walls of the chamber (17) being supported on the inner side of the peripheral wall tube (13) and the inner one of said peripheral walls of the chamber (17) being supported on the outer side of the core tube (12), said peripheral walls (18, 19) being connected to the sealing closure elements (14, 15) in a sealed manner.

2. Filter element according to claim 1, wherein the perforated core tube (12) comprises at one end, a section which is impervious to fluids.

3. A filter element for filtering fluids, comprising in combination:

a) inner and outer spaced-apart tubular porous wall members (18, 19),
b) end wall members (14, 15) having impervious portions connected to the ends of said tubular wall members and forming therewith a filtering chamber (17), and
c) a bulk material filling (21) comprising a mixture of particulate and/or fibrous particles disposed in said filtering chamber,
d) some of said particles being smaller than others, and said wall members holding captive the bulk material filling, at least one of said inner and outer spaced-apart wall members being constituted as a wet-resistant support layer for said filter element, said bulk material consisting substantially of auxiliary filtering agents capable of being carried to, and being collected by said fluid, and formed into a cake disposed against and engaged with said one wall member, the porosity of said one wall member being insufficient to enable said smaller particles to pass through it,
e) said collected cake of auxiliary filtering agents forming on said one wall member, as the fluid is being filtered, a deep bed filter,
f) said chamber (17) being disposed inside a filter element frame (11), which is formed int he manner of a filter cartridge and which comprises a perforated core tube (12), a perforated wall tube (13), and said end wall members (14, 15) holding said tubes (12, 13) in position and being secured to at least one of said tubes, one (18) of the said porous wall members (18, 19) being supported on the inner side of the peripheral wall tube (13) and the other (19) of said porous wall members (18, 19) being supported on the outer side of the core tube (12), said porous wall members (18, 19) being connected to the end wall members (14, 15) in a sealed manner.

4. A filter element as set forth in claim 3, wherein:
a) said particles are of both finer and coarser texture.

5. A filter element as set forth in claim 3, wherein:
a) said particles are of both larger and smaller lengths.

6. A filter element as set forth in claim 3, wherein:
a) the particles are of both finer and coarser texture, and
b) the particles are of both larger and smaller lengths.

7. A filter element as set forth in claim 3, wherein:
a) said collected cake is disposed on the inside of the outer one of said tubular wall members.

8. A filter element as set forth in claim 3, wherein:
a) said collected cake is disposed on the outside of the inner one of said tubular wall members.

9. A filter element as set forth in claim 3, and further including:
a) an intermediate tubular porous wall member in said filtering chamber, coaxial with and spaced from said inner and outer tubular wall members and connected to said end wall members, said intermediate tubular porous wall member having opposite wall surfaces,
b) some smaller particles of said bulk material filling mixture being collected against one wall surface of said intermediate porous member, and some larger particles of said filling mixture being collected against the opposite wall surface of said intermediate porous member.

* * * * *